United States Patent [19]

Neustadter

[11] Patent Number: 4,902,232
[45] Date of Patent: Feb. 20, 1990

[54] DENTAL TRAINING MODEL WITH ARTIFICIAL TEETH SET

[76] Inventor: Irving Neustadter, 8971 S. Hollybrook Blvd., Pembroke Pines, Fla. 33025

[21] Appl. No.: 246,340

[22] Filed: Sep. 19, 1988

[51] Int. Cl.$^4$ ............................................. G09B 23/34
[52] U.S. Cl. ..................................................... 434/263
[58] Field of Search ................... 434/263, 264; 433/71, 433/75, 173, 213; 403/348

[56] References Cited

U.S. PATENT DOCUMENTS

| | | | |
|---|---|---|---|
| 1,948,059 | 2/1934 | Baugh | 434/263 |
| 2,005,114 | 6/1935 | Spitzer et al. | 434/263 |
| 2,266,434 | 12/1941 | Morrison | 433/60 |
| 3,458,936 | 8/1969 | Schulz et al. | 434/263 |
| 3,982,841 | 9/1976 | Ednzweig | 403/348 |
| 4,035,097 | 9/1977 | Bachand | 403/348 |
| 4,497,141 | 2/1985 | Jarby | 403/348 |

FOREIGN PATENT DOCUMENTS 2122796 of 1984 United Kingdom ................. 434/263

OTHER PUBLICATIONS

*Mechanisms, Linkages, and Mechanical Controls*, Chironis, ed., @1965, pp. 346-347, Frederico Strasser.

Primary Examiner—Edward M. Coven
Assistant Examiner—Valerie Szczepanik
Attorney, Agent, or Firm—Eliot S. Gerber

[57] ABSTRACT

A teaching model for dental students includes an upper and a lower jaw each with removable artificial teeth which resemble natural teeth in their hardness and appearance. Each tooth has a crown portion, which extends above the gum line, and a root portion. The root portion is oval-shaped, in cross-section, and tapered along its axis to closely fit in an oval and tapered socket in the jaw. The jaw has open socket holes so that the root portions protrude through orifices in the bottom face of the jaw. Each tooth root portion has embedded therein a rotatable quarter-turn locking device whose locking head passes through the socket orifice and, when turned 90°, cams on the bottom face of the jaw to draw the tooth into its socket and thereby lock the tooth in position. A tooth is readily replaced by turning the locking head backwards 90° to release the tooth.

5 Claims, 2 Drawing Sheets

DENTAL TRAINING MODEL WITH ARTIFICIAL TEETH SET

BACKGROUND OF THE INVENTION

1. Field of the Invention

The present invention relates to dental teaching models and more particularly to a set of upper and lower artificial (false) teeth, and their supporting gum and jaw structure.

2. Description of the Related Art

At the present time, in United States dental schools, first and second year students do not generally practice dentistry on patients. Instead, those students utilize teaching aids in the form of a model of sets of artificial teeth. The students utilize the sets of artificial teeth to simulate a live patient. Often a model of a set of artificial teeth is placed in an artificial skull which is then held in a dental chair so that the location and orientation of the false teeth are similar to the location and orientation of the teeth of an actual patient who is sitting in a dental chair.

The dental students may perform, on the artificial teeth, many of the dental skills they learn in the classroom, such as drilling the teeth, filling cavities, etc.

The presently commercially available dental teaching models of artificial teeth have a number of disadvantages. That type of model is shown generally in U.S. Pat. No. 2,005,114 to Spitzer et al entitled "Dental Model". First, the teeth are held in a model, representing the jaw and gum, by screws. When replacement of teeth is necessary, it is annoying and time-consuming to replace the teeth. Secondly, the teeth, when being worked on by a drill, may have a tendency to become loosened due to the vibrations of the drill. Such loosened teeth do not accurately simulate teeth in a patient. In addition, the teeth are of a very hard substance and not like the actual teeth which have the hardness of an enamel.

A number of patents have issued in the past for dental models with false teeth. In U.S. Pat. No. 3,458,936 to Schulz et al entitled "Dental Model With Teeth Retainer-Pins", each tooth is mounted on an elongated pin having a central square portion and a bottom head portion which snap, for retention, into holes in a flexible plastic under layer.

In U.S. Pat. No. 2,750,670 to Vigg entitled "Dental Model", the artificial teeth are held in sockets by a flexible cement and therefore they are not easily replaced. The Vigg dental model, like that of Schultz, did not obtain widespread or sustained acceptance in the dental field.

The following dental models are suitable for teaching purposes. In U.S. Pat. No. 3,226,827 to Splaten entitled "Dental Apparatus", the teeth are mounted on dowel pins so that they are not secured. U.S. Pat. No. 1,822,043 to Kohler entitled "Dentist's Model" uses a pin which fits into a flexible tube. U.S. Pat. No. 1,948,059 to Baugh uses a tooth mounted on a pin which fits into a spring device. U.S. Pat. No. 1,387,540 to Hawksworth et al entitled "Technical Anatomical Dental Model" uses groove and root retaining beads. U.S. Pat. No. 1,711,947 to Ingwesen entitled "Dental Model" uses roots with lugs. U.S. Pat. No. 2,266,434 to Morrison entitled Dental Model" is a demonstration model to educate the patient, in which the teeth are mounted on threaded pins which fit by friction into holes. U.S. Pat. No. 1,045,920 to Wenker entitled "Dental Form" shows a demonstration model in which the teeth are embedded in rubber jaws.

OBJECTIVES AND FEATURES OF THE INVENTION

It is an objective of the present invention to provide a teaching model for use by dental students, the model being the jaws and their gums, along with sets of artificial teeth which are removable connected in the jaws and gums, in which model the removal and replacement of the teeth is convenient, rapid and without danger of losing parts.

It is a further objective of the present invention to provide such a dental teaching model in which the artificial teeth are firmly held in the jaws and gums and are not loosened by vibration when the teeth are drilled or otherwise worked upon.

It is a further objective of the present invention to provide such a dental teaching model in which the teeth, jaws and gums relatively closely simulate the appearance and feel, to the dental student, of real teeth, jaws and gums.

It is a further objective of the present invention to provide such a dental teaching model which is not relatively more costly than presently commercially available teaching models in which the artificial teeth are held in position by screws.

It is a further objective of the present invention to provide such a dental teaching model in which each artificial tooth has a specific socket in the artificial jaw which only that tooth will fit, so that the teeth may not be mislocated in the jaw.

It is a further objective of the present invention to provide such a dental model in which the teeth simulate the hardness of real teeth and in which the jaw models are durable and interchangeable so that the student may work on many sets of artificial teeth without having to purchase a new set of jaw models.

SUMMARY OF THE INVENTION

In accordance with the present invention, there is provided a dental model in which the artificial teeth are held firmly and accurately in the sockets of the jaw and gum and yet the teeth may be conveniently replaced. A set consists of a lower jaw (mandibular) and an upper jaw (maxilary), each molded of a suitable plastic resin. Each jaw has vertically aligned through socket holes which are oval in cross-section and tapered the socket. The size and oval shape of each socket varies to accommodate the tooth location.

The artificial teeth (anterior teeth, bicuspid teeth, molars) are of a suitable hard molded plastic. Each tooth has an elongated root body portion with its proportioned root size which fits in a jaw socket and a crown portion which resembles the shape and color of a real tooth.

A one-quarter-turn locking device has an exposed oval-shaped locking head and an unexposed portion which is molded into the root of the tooth. To secure a tooth in its socket, the usert inserts the tooth from the top (gum side) of the jaw until its root (body portion) and locking device reach the bottom of the open end hole. The user will then lock the tooth in position by turning the locking device head 90° (one-quarter turn). That rotation requires some force, applied by a screw driver, as the head cams the artificial tooth downward with the enlarged crown portion of the tooth in tight engagement with its matching gum socket.

BRIEF DESCRIPTION OF THE DRAWINGS

Other objectives and features of the present invention will be apparent from the following detailed description taken in conjunction with the accompanying drawings.

In the drawings.

DESCRIPTION OF THE PREFERRED EMBODIMENT

Figure 1:
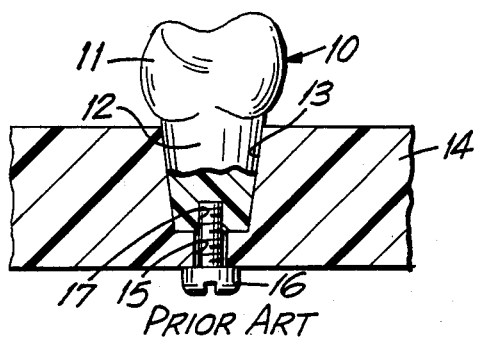
FIG. 1 is a side cross-sectional view of a tooth of a prior art teaching model.
Figure 2:
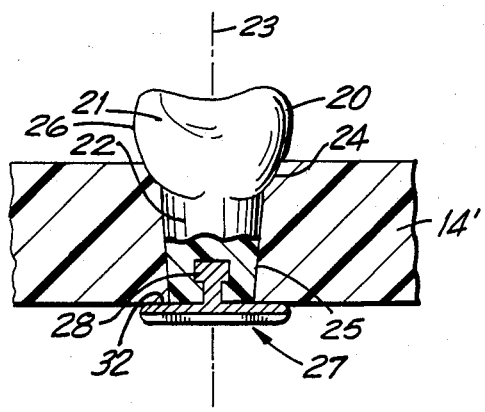
FIG. 2 is a side cross-sectional view of a tooth of the teaching model of the present invention.

The structure of a prior art artificial tooth mounting system in a conventional prior art dental model is shown in FIG. 1. That artificial tooth ("peg") 10 has an upper crown portion 11 which is to be worked upon by the dental student. The crown portion 11 is integral with the root (body) portion 12 which is a right-cylinder. The root portion 12 fits in a matching cavity 13 of the artificial jaw 14. The cavity 13 has a small bottom hole 15 through which a screw 16 extends. The screw 16 clamps the artificial tooth 10 into the cavity 16 by extending into screw-threaded hole 17 in the tooth 10. The screw attachment is time-consuming to fasten and unfasten, especially when teeth have to be replaced.

As shown in FIGS. 2-7, the attachment system of the present invention does not use screws. The artificial tooth 20 has a crown (head) portion 21, which simulates the appearance, size, shape and approximate hardness of a natural tooth. The crown portion 21 is integral with a root (body) portion 22. The root portion 22 is elongated and is oval in cross-section. The cross-sections are perpendicular to imaginary axis 23, see FIG. 7. The root portion 22 is tapered in shape along the length of the imaginary axis 23. A through-socket hole 24 in the artificial jaw 14 is oval in cross-section at its root portion 25 and in that lower root portion 25 is tapered in cross-sectional size and shape (the cross-sections perpendicular to axis 23). The upper crown portion 26 of the socket 24 is enlarged and forms a gum-like shoulder for the crown portion 21 of the tooth. There is a close fit between the shoulder and the crown, the gap in the drawing being shown only for illustration of the parts.

A quarter-turn locking device is secured at the bottom face of the tooth 20. The locking device 27 has an enlarged cylindrical inner head portion 28 which is embedded and rotatable in a cavity in tooth 20 and which holds the locking device 27 in the tooth 20 and permits its rotation with respect to the tooth, i.e., rotation about axis 23. The locking device 27 also has a cylindrical neck portion 29 and a locking head portion 30. The locking head portion has an elongated channel 31 to receive the blade of a small screw driver, see FIG. 3. The face 32 of the head portion 30 turns on the lower face of the artificial jaw 14' and locks the tooth firmly in position in its socket.

Figure 3:
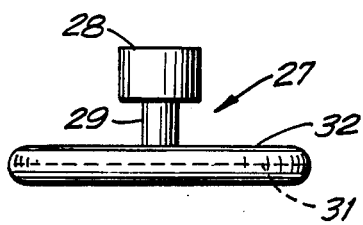
FIG. 3 is an enlarged side view of the locking device of the present invention.
Figure 4:
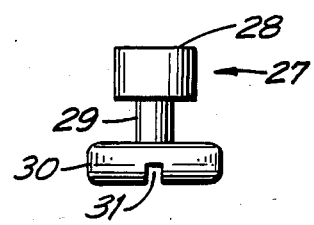
FIG. 4 is an enlarged front view of the locking device of FIG. 3.
Figure 5:
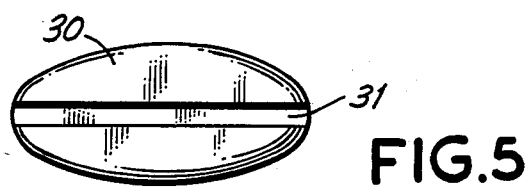
FIG. 5 is an enlarged bottom plan view of the locking device of FIG. 3.

As shown in FIGS. 3 and 4, the head portion of the locking device is longer in one direction (length) compared to its crosswise direction (width). The size varies with the tooth to which it is attached and the size conforms with, and is smaller than, the bottom face of the end root of its tooth.

Figure 6:
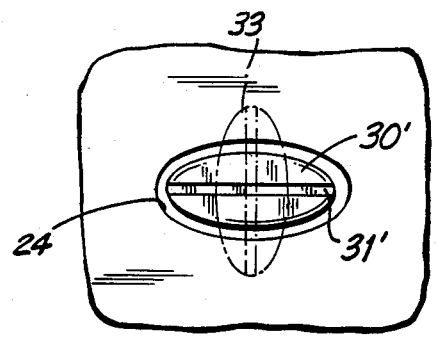
FIG. 6 is a bottom plan view of the locking device in operation.

FIG. 6 shows the bottom of a hole 32 (corresponding to hole 25) through which the oval head 30' is fitted. The head 30' is then turned 90° to its dashed line position 33, in which it secures the tooth in position. The tooth can be removed whenever necessary by turning one-quarter turn (90°) backwards to the starting position.

Figure 7:
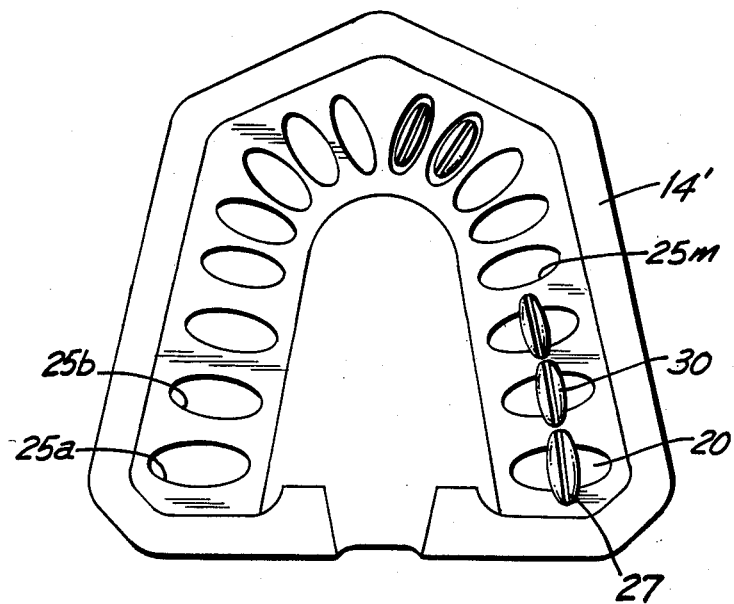
FIG. 7 is a bottom view of a jaw of the teaching model of the present invention.

In FIG. 7 a bottom jaw is shown and only five teeth are illustrated as being in position. It will be understood, however, that the dental model comprises an upper jaw, a lower jaw and all 32 teeth. In the jaw the through-holes 25a–25m are each oval in general shape and different in size and exact shape so that only a corresponding and correct artificial tooth will fit in the socket hole.

The following is a description of certain sizes and materials of the preferred embodiment, although other suitable sizes and materials may be employed. The jaws and gums are made of a suitable plastic which is colored a gum pink color and the jaw bone is colored to resemble the natural jaw and gum. The size of the oval-shaped sockets differ. The sizes are only preferable and not limiting. Seen from the bottom (as in FIG. 7) a typical molar 25a, and its matching artificial tooth, is 8/32-inch in length (buckle to lingual) and 5/32-inch wide (distal to measual). Preferably the sizes of the holes (at the bottom ends) is in the range of 4/32 to 7/32 wide and 6/32 to 9/32 long.

Preferably the sizes of the locking head portions are as follows: lower anterior teeth 3/32 wide, 5/32 long; lower and upper bicuspids ⅛ wide, 7/32 long; and upper and lower molars ⅛ wide, 9/32 long (all dimensions are in inches).

I claim:

1. A dental model comprising an artificial lower jaw and an artificial upper jaw, each having upper exposed faces with gum-like portions thereon and bottom faces, and a plurality of artificial teeth removably inserted into each of said artificial jaws;

each of said jaws having a plurality of socket holes to receive said artificial teeth with one socket hole for each tooth; each of the socket holes having an imaginary central axis extending through a jaw and comprising a lower portion and an upper portion, said upper portion having an orifice at said jaw upper face and said lower portion having an orifice at said jaw bottom face; the cross-sections of said socket hole lower portion taken perpendicular to said axis being oval and said lower portion being tapered along said axis;

each of said teeth having an upper crown portion which resembles a natural tooth and which fits into said socket hole and protrudes above said jaw upper face, and a root portion which fits into said lower socket hole portion, each root portion having a bottom face, each of said root portions being oval in shape perpendicular to said axis and being tapered along said axis;

a quarter-turn fastener pivotally secured in said root portion and turnable relative to said tooth about said axis a quarter turn to lock said tooth in said socket hole, said fastener including a locking head portion which fits through said socket hole lower portion orifice when in unlocked orientation, said locking head portion having an exposed lower face having turning means thereon and having an upper face which contacts, cams and locks against the bottom face of the jaw adjacent said socket hole when said fastener is in a rotated and locked orientation.

2. A dental model as in claim 1 wherein the holes are graded in size.

3. A dental model as in claim 1 wherein said turning means is a screw slot.

4. A dental model as in claim 1 wherein each of said locking head portions is oval in shape in a section perpendicular to said axis.

5. A dental model as in claim 1 wherein each said locking device is molded in the root portion of the tooth, thus rendering tooth and locking device as a complete unit to prevent separation from each other.

* * * * *